Jan. 25, 1938.  C. J. OFFICER, JR  2,106,649
MEASURING DEVICE
Filed Feb. 15, 1937
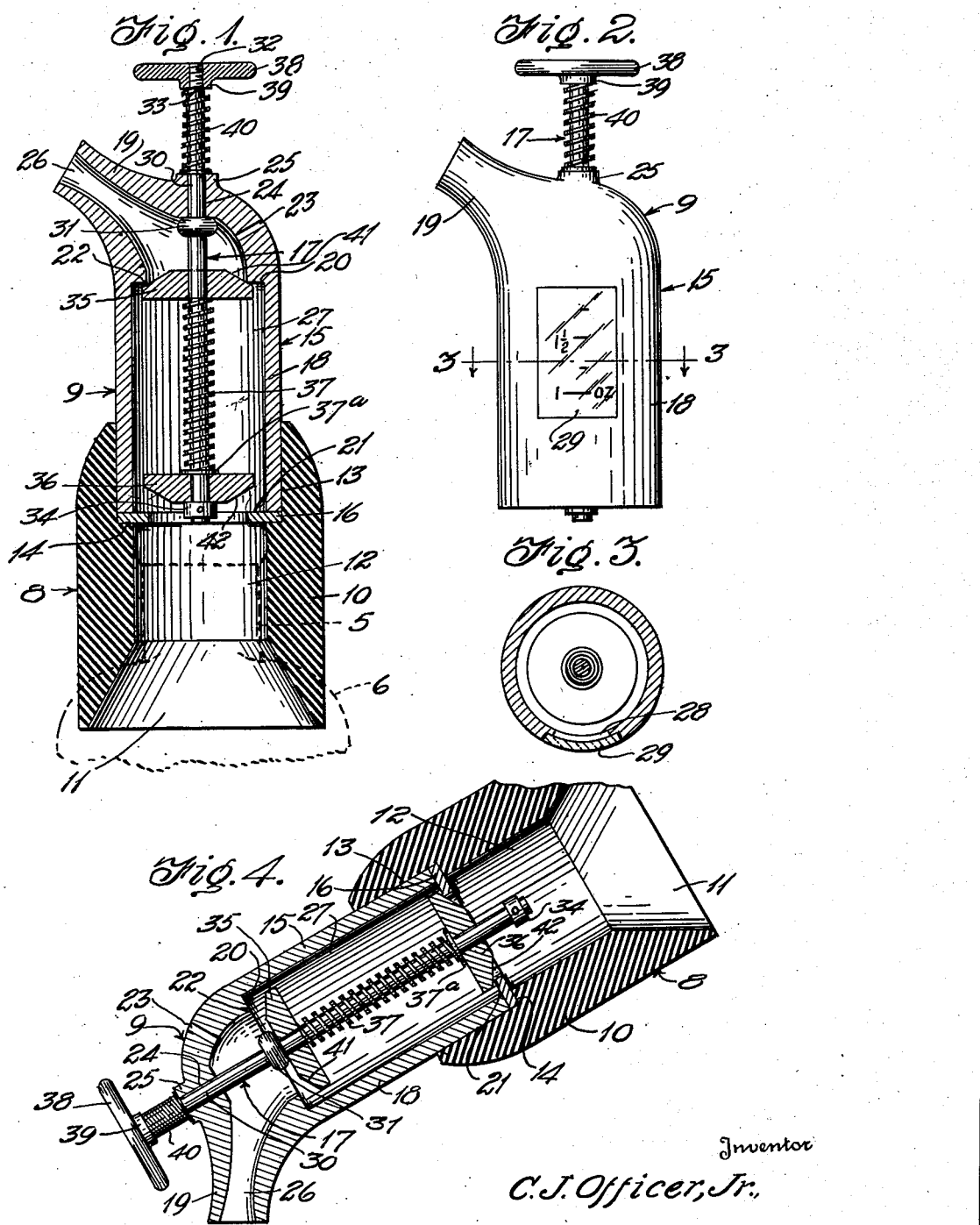
Inventor
C. J. Officer, Jr.,
By Kimmel & Crowell
Attorneys Patented Jan. 25, 1938

2,106,649

UNITED STATES PATENT OFFICE 2,106,649

MEASURING DEVICE

Charles J. Officer, Jr., Tillamook, Oreg.

Application February 15, 1937, Serial No. 125,917

8 Claims. (Cl. 221—110)

This invention relates to a measuring device, and has for its object to provide, in a manner as hereinafter set forth, a device of such class to be attached to a bottle containing a liquid for measuring the required amount of the contents thereof to be used in a mixed drink.

A further object of the invention is to provide, in a manner as hereinafter set forth, a measuring device for the purpose aforesaid, but also acting when not performing its measuring function as a closure for the mouth of the bottle to which it is attached.

Further objects of the invention are to provide, in a manner as hereinafter set forth, a measuring device for the purpose aforesaid which is simple in its construction, strong, durable, compact, readily installed with respect to the neck of a bottle, conveniently operated, thoroughly efficient in its use, and inexpensive to manufacture.

To the above ends essentially and to others which may hereinafter appear, the invention consists of the novel construction, combination and arrangement of parts as will be more specifically described and are as illustrated in the accompanying drawing wherein is shown an embodiment of the invention, but it is to be understood that changes, variations and modifications may be resorted to which fall within the scope of the invention as claimed.

In the drawing:

Figure 1 is a vertical sectional view of the device installed with respect to the neck and breast portions of a bottle, the latter being shown in dotted lines, Figure 2 is an elevation looking towards one side of the combined measuring and discharge element for the liquid, Figure 3 is a section on line 3—3, Figure 2, and Figure 4 is a lengthwise sectional view of the device when tilted to liquid discharging position.

With reference to the drawing the neck 5 and breast 6 of a bottle are shown in dotted lines. The neck 5 is flanged as at 7.

The measuring device includes a coupling element 8 and a combined measuring and discharge element 9 for the liquid.

The element 8 consists of a tubular body 10 formed of any suitable resilient material possessing the necessary frictional clamping characteristic to tightly bind against neck 5 and element 9 whereby the bottle and the device are secured together to prevent their separation under ordinary conditions. The body 10 is open at each end and has its inner face formed of tapered inner end portion 11, an intermediate portion 12 of uniform diameter and an outer end portion 13 of uniform diameter and of greater diameter than portion 12. The junction of the portions 12, 13 provide the inner face of body 10 with an annular shoulder 14 which provides a seat for a purpose to be referred to. The portion 11 of the inner face of body 10 is to bear against breast 6. The portion 12 of the inner face of body 10 is to encompass and bear against neck 5 and the portion 13 of the inner face of body 10 is to encompass and bear against element 9. The latter when the device is set up has its inner end seated against shoulder 14. The element 9 is of greater length than that of portion 13 of the inner face of body 10. When the device is assembled the element 9 extends from the outer end of element 8. That portion 11 of the inner face of body 10 will be of such diameter relative to breast 6 as to provide body 10 to frictionally clamp the breast 6 thereto. That portion 12 of the inner face of body 10 will be of such diameter relative to neck 5 as to provide body 10 to frictionally clamp neck 5 thereto. The portion 13 of the inner face of body 10 will be of such diameter relative to element 9 as to provide body 10 to frictionally clamp element 9 thereto.

The element 9 includes a body part 15, an annulus 16 and a spring controlled, vertically movable, slidably mounted, double-acting valve structure 17. The body part 15 and annulus 16 are formed of any suitable material. The inner end of body part 15 is mounted on annulus 16. The latter is mounted on shoulder 14. The body part 15 consists of an inner cylindrical portion 18 of uniform diameter and an outer tapered tubular portion 19 which merges at its inner end into the outer end of and is disposed at an angle with respect to said portion 18. The inner diameter of portion 18 is greater than that of portion 19. The latter at the inner ends overhangs the inner face of portion 18 as indicated at 20. The inner diameter of portion 18 is greater than the inner diameter of annulus 16. The latter provides a valve seat as indicated at 21. The inner end of portion 19 provides a valve seat as indicated at 22. The portion 19 adjacent its inner end is formed with an inclined air port 23, between port 23 and its outer end with a vertical opening 24 and on its outer periphery with an annular boss 25 surrounding the outer end of opening 24. The opening 24 aligns with the axis of the portion 18. The portion 19 provides a discharge spout for the measured liquid. The portion 19 is of such contour as to provide a liquid discharge passage 26 which decreases in diameter from the inner to the outer end thereof. The port 23 opens into passage 26.

The portion 18 in connection with the annulus 16 and the inner end of portion 19 provides a measuring chamber 27. The portion 18, lengthwise of one side thereof is formed with an opening 28 closed by a transparent panel 29 provided with a liquid measuring scale, as shown by way of example as a scale of ounces. The panel 29 enables the user to view the interior of portion 18 to ascertain the amount of the liquid within chamber 27.

The valve structure 17 includes an inwardly and outwardly slidable valve stem 30 formed intermediate its ends with a boss 31, having its outer end terminal portion 32 reduced and threaded and a shoulder 33 at the inner end of portion 32. The stem 30 in proximity to its inner end has detachably connected thereon a collar 34. Carried by the stem 30 is an outer and an inner spring-urged circular valve 35, 36 respectively of like form. The valves 35, 36 are oppositely disposed and held in spaced relation by the pressure of a coiled spring 37 encompassing stem 30. The outer end of spring 37 bears against the inner face of valve 35. The inner end of spring 37 bears against a washer 37ᵃ on the outer face of valve 36. Secured to the reduced portion 32 of stem 30 is a finger or thumb piece 38 of buttonlike form provided with a depending collar 39 which bears against shoulder 32. The stem 30 extends through opening 24, the portion 19 and into the chamber 27. A controlling spring 40 of the coiled type is provided for stem 30. The spring 40 encompasses stem 30 and is interposed between the bosses 25 and 39.

The valves 35, 36 are formed of any suitable material. The valve 35 has the part 41 of its upper face beveled whereby it will extend into the inner end of portion 19 when seated. The part 41 is to engage seat 22. The valve 36 has the part 42 of its lower face beveled whereby it will extend into the annulus 16 when seated. The part 42 is to engage seat 21. The valves 35, 36 are closely fitted to the stem 30, however, the fit is such as to permit of the stem 30 to slip or slide through the valves when actuated by the pressure exerted on the button-like piece 38 offsetting the pressure of the springs 37, 38.

In operation, the device is connected to the open neck of the bottle. The latter is then inverted and the liquid in the bottle run into the chamber 27 past the valve 36. When the desired amount of liquid is supplied to chamber, pressure is then exerted on the button-like piece 38 moving the stem 30 through valve 35 until valve 36 is seated. At this juncture both valves are seated and the liquid supplied to chamber 27 held therein. The bottle may then be turned upright or in any other position with the supplied liquid retained in chamber 27 while the stem is held in position to close both valves. Then by compressing piece 38 still further, the boss 31 will contact valve 35, compressing spring 37, opening valve 35, permitting the liquid to be discharged from chamber 27 through the spout provided by the portion 19 into a receptacle.

The collar 34 prevents the separation of valve 36 from stem 30. It is to be understood that there may be substituted for the boss 31 a collar attached to stem 30 and of the same form as collar 34. The valve 35 is an outlet valve and the valve 36 an intake valve for chamber 27.

The device will expedite the mixing of liquids for beverage purposes, provide an accurate method of measuring from the container the proper amounts to be withdrawn therefrom and at the same time serve as a seal or stopper for the container by reason of the fact that when the button 38 is released the valve 35 closes automatically and serves as a stopper. In soft drink establishments and where liquors are dispensed, the device would be used in different sizes for measuring different commodities to be mixed. To illustrate further, a vermouth bottle would be equipped with a measure that would hold one-half ounce, while a whiskey bottle would perhaps be equipped with one that would hold two ounces, and a coca cola bottle probably should measure three ounces, that it to say, each of the bottles should be equipped with a measuring device suitable for the amounts to be ordinarily drawn from the bottle.

What I claim is:

1. In a measuring device, a structure providing a liquid measuring chamber and a liquid discharge spout leading from and communicating with the outer end of the latter, the inner end of said chamber being open, said structure including means to provide an intake valve seat at the inner end of the chamber and an outlet valve seat at the outer end of the chamber, intake and outlet valves arranged in said chamber for engaging said seats, an inwardly and outwardly slidable spring controlled valve stem disposed within said structure and passing through and extended from said spout, said stem extending through and having a sliding fit with said valves, a spring carried by the stem and interposed between and normally tending to urge said valves towards their seats and for maintaining the valves in spaced relation, and said spout being formed with an air port adjacent the point of the passage of the stem through the spout.

2. In a measuring device, a structure providing a liquid measuring chamber and a liquid discharge spout leading from and communicating with the outer end of the latter, the inner end of said chamber being open, said structure including means to provide an intake valve seat at the inner end of the chamber and an outlet valve seat at the inner end of the spout, said outlet valve seat being positioned at the outer end of the chamber, intake and outlet valves arranged in said chamber for engaging said seats, an inwardly and outwardly slidable spring controlled valve stem disposed within said structure, said valve stem passing through the body of and slidably mounted in said spout, said valve stem being extended outwardly from said spout, said stem extending through and having a sliding fit with the said valves, a spring carried by the stem and interposed between and normally tending to urge said valves towards their seats and for maintaining the valves in spaced relation, said spout being formed with an air port adjacent the point of the passage of the stem through the spout, and said stem provided with means for shifting the outlet valve from off its seat when the intake valve is on its seat during the inward sliding of the stem through said valves.

3. In a measuring device, a structure providing a liquid measuring chamber and a liquid discharge spout leading from and communicating with the outer end of the latter, the inner end of said chamber being open, said structure including means to provide an intake valve seat at the inner end of the chamber and an outlet valve seat at the inner end of the spout, said outlet valve seat being positioned at the outer end of the chamber, intake and outlet valves arranged in said chamber for engaging said seats, an inwardly and outwardly slidable spring controlled valve stem disposed within said structure, said valve stem passing through the body of and slidably mounted in said spout, said valve stem being extended outwardly from said spout, said stem extending through and having a sliding fit with the said valves, a spring carried by the stem and interposed between and normally tending to urge said valves towards their seats and for maintaining the valves in spaced relation, said stem provided with means for shifting the outlet valve from off its seat when the intake valve is on its seat during the inward sliding of the stem through said valves, and a resilient tubular coupling element for connecting said structure to a liquid container.

4. In a measuring device, a structure providing a liquid measuring chamber and a liquid discharge spout leading from and communicating with the outer end of the latter, the inner end of said chamber being open, said structure including means to provide an intake valve seat at the inner end of the chamber and an outlet valve seat at the inner end of the spout, said outlet valve seat being positioned at the outer end of the chamber, intake and outlet valves arranged in said chamber for engaging said seats, an inwardly and outwardly slidable spring controlled valve stem disposed within said structure, said valve stem passing through the body of and slidably mounted in said spout, said valve stem being extended outwardly from said spout, said stem extending through and having a sliding fit with the said valves, a spring carried by the the stem and interposed between and normally tending to urge said valves towards their seats and for maintaining the valves in spaced relation, said stem provided with means for shifting the outlet valve from off its seat when the intake valve is on its seat during the inward sliding of the stem through said valves, and that part of said structure forming the measuring chamber formed with an opening and a transparent panel closing said opening and provided with a measuring scale.

5. In a measuring device, a hollow combined liquid measuring and discharging element formed with an intake valve seat at its inner end, an outlet valve seat intermediate its ends and a discharge passage leading from said outlet valve seat, intake and outlet valves within said element for coaction with said seats, an inwardly and outwardly slidable valve stem arranged within, extending across the inner portion of said passage and slidably mounted in and extended outwardly from the outer end of said element, said stem passing through and being slidably fitted to said valves, a spring carried by the stem and interposed between said valves for urging them towards their seats, a part at the outer end of said stem for the application of pressure, a controlling spring for the stem carried by the latter and interposed between said part and the outer end of the said element, and said stem provided with means for shifting the outlet valve from its seat while the intake valve is seated.

6. In a measuring device, a combined liquid measuring and discharging element formed with an intake valve seat at its inner end, an outlet valve seat intermediate its ends and a discharge passage leading from said outlet valve seat, intake and outlet valves within said element for coaction with said seats, an inwardly and outwardly slidable valve stem arranged within, slidably mounted in one end of and extended outwardly from the said end of said element, said stem passing through and being slidably fitted to said valves, a spring carried by the stem and interposed between said valves for urging them towards their seats, a part at the outer end of said stem for the application of pressure, a controlling spring for the stem carried by the latter and interposed between said part and said element, said stem provided with means for shifting the outlet valve from its seat while the intake valve is seated, and a resilient tubular coupling element for connecting the combined liquid measuring and discharging element to a liquid supply container.

7. In a measuring device, a combined liquid measuring and discharging element formed with an intake valve seat at its inner end and an outlet valve seat intermediate its ends, intake and outlet valves within said element for coaction with said seats, an inwardly and outwardly slidable valve stem arranged within and extended from said element, said stem passing through and being slidably fitted to said valves, a spring carried by the stem and interposed between said valves for urging them towards their seats, a part at the outer end of said stem for the application of pressure, a controlling spring for the stem carried by the latter and interposed between said part and said element, said stem provided with means for shifting the outlet valve from its seat while the intake valve is seated, the body of said element being formed intermediate its ends with an opening, and a transparent panel closing said opening and provided with a liquid measuring scale.

8. In a measuring device, a combined liquid measuring and discharging element formed with an intake valve seat at its inner end and an outlet valve seat intermediate its ends, intake and outlet valves within said element for coaction with said seats, an inwardly and outwardly slidable valve stem arranged within and extended from said element, said stem passing through and being slidably fitted to said valves, a spring carried by the stem and interposed between said valves for urging them towards their seats, a part at the outer end of said stem for the application of pressure, a controlling spring for the stem carried by the latter and interposed between said part and said element, said stem provided with means for shifting the outlet valve from its seat while the intake valve is seated, the body of said element being formed intermediate its ends with an opening, a transparent panel closing said opening and provided with a liquid measuring scale, and a resilient tubular coupling element for connecting the combined liquid measuring and discharging element to a liquid supply container.

CHARLES J. OFFICER, JR.